(12) United States Patent
Sainaney et al.

(10) Patent No.: US 10,475,257 B2
(45) Date of Patent: Nov. 12, 2019

(54) VEHICLE TELEMATICS COMPATIBILITY

(71) Applicant: MOJ.IO INC., Vancouver (CA)

(72) Inventors: Narayan Sainaney, Vancouver (CA); Philip Fu, Sunnyvale, CA (US)

(73) Assignee: MOJ.IO, Inc., Vancouver, BC (CA)

( * ) Notice: Subject to any disclaimer, the term of this patent is extended or adjusted under 35 U.S.C. 154(b) by 225 days.

(21) Appl. No.: 15/612,163

(22) Filed: Jun. 2, 2017

(65) Prior Publication Data

US 2018/0350160 A1 Dec. 6, 2018

(51) Int. Cl.
*G07C 5/00* (2006.01)
*H04L 29/08* (2006.01)
*H04Q 9/00* (2006.01)
*H04W 4/40* (2018.01)

(52) U.S. Cl.
CPC .............. *G07C 5/006* (2013.01); *H04L 67/12* (2013.01); *H04L 67/306* (2013.01); *H04Q 9/00* (2013.01); *H04W 4/40* (2018.02); *H04Q 2209/40* (2013.01)

(58) Field of Classification Search
CPC ...................................................... G07C 5/006
See application file for complete search history.

(56) References Cited

U.S. PATENT DOCUMENTS

| | | | | |
|---|---|---|---|---|
| 9,367,968 B2* | 6/2016 | Giraud | .................... | G07C 5/008 |
| 9,894,526 B2* | 2/2018 | Giraud | .................... | G07C 5/008 |
| 2009/0177336 A1* | 7/2009 | McClellan | .......... | B60R 25/2018 |
| | | | | 701/2 |
| 2013/0145482 A1* | 6/2013 | Ricci | ....................... | H04W 4/90 |
| | | | | 726/28 |
| 2014/0213238 A1* | 7/2014 | Giraud | .................... | G07C 5/008 |
| | | | | 455/418 |
| 2016/0330284 A1* | 11/2016 | Holck | ..................... | H04L 67/12 |

* cited by examiner

*Primary Examiner* — Hussein Elchanti
*Assistant Examiner* — Michael A Berns

(57) ABSTRACT

A telematics platform including a telematics service and a telematics device interfacing with an on-board electronic system of a vehicle, performs a compatibility workflow with respect to the vehicle-telematics device compatibility and data accuracy. The compatibility workflow may include multiple phases in which telematics data is assessed for compatibility or inaccuracies based on pre-established compatibility data obtained from a population of other vehicle-telematic device interactions, user-reported compatibility data, and vehicle-specific compatibility data. Incompatibility or inaccuracies in telematics data may be used to activate/deactivate or continue/discontinue interactions between the vehicle and the telematics device, and to inform users of the incompatibility of the vehicle-telematics device pair, or inaccuracies in the telematics data.

19 Claims, 6 Drawing Sheets

VEHICLE TELEMATICS COMPATIBILITY

BACKGROUND

Modern vehicles typically include an on-board electronic system that controls, measures, and provides reports regarding operation of the vehicle's various subsystems. On-board electronic systems may include or otherwise support on-board diagnostic (OBD) services that enable vehicle owners and repair technicians to access diagnostic information or other forms of operational information. As one example, an on-board electronic system of a vehicle may be accessed via an OBD interface in the form of a physical connector. OBD information may be communicated over this OBD interface using a variety of protocols, including ALDL, OBD-I, OBD-1.5, OBD-II, etc.

SUMMARY

A telematics platform including a telematics service and a telematics device interfacing with an on-board electronic system of a vehicle, performs a compatibility workflow with respect to the vehicle-telematics device compatibility and data accuracy. The compatibility workflow may include multiple phases in which telematics data is assessed for compatibility or inaccuracies based on pre-established compatibility data obtained from a population of other vehicle-telematic device interactions, user-reported compatibility data, and vehicle-specific compatibility data. Incompatibility or inaccuracies in telematics data may be used to activate/deactivate or continue/discontinue interactions between the vehicle and the telematics device, and to inform users of the incompatibility of the vehicle-telematics device pair, or inaccuracies in the telematics data.

During an initial phase of the compatibility workflow, the telematics service obtains a set of telematics data for a vehicle transmitted by a telematics device over a wireless communication network. The telematics device interfaces with an on-board electronic system of the vehicle via an on-board diagnostics (OBD) link. A vehicle identifier of the vehicle and a device identifier of the telematics device is identified within the set of telematics data. Account profile information is updated to indicate a relationship between the vehicle identifier and the device identifier. Vehicle profile information is retrieved for a group of vehicles of which the vehicle is a member based on the vehicle identifier. The vehicle profile information includes compatibility data for the group of vehicles with respect to a group of telematics devices of which the telematics device indicated by the device identifier is a member.

Responsive to the compatibility data indicating a first state representing an incompatible relationship for the initial phase of the compatibility workflow, a deactivation message may be sent to the telematics device indicated by the device identifier over the wireless communication network. The compatibility data for the group of vehicles may be based on previously reported sets of telematics data obtained from other telematics devices of the group of telematics devices for other vehicles of the group of vehicles. The deactivation message is operable at the telematics device to deactivate at least one interaction of the telematics device with the on-board electronic system of the vehicle via the OBD link. The account profile information may be updated to indicate the deactivation of the interaction of the telematics device with the on-board electronic system. The account profile information or a portion thereof may be sent to a client application operating at a client device over a wide area network, enabling the client application to present an indication of the deactivation of the telematics device to a user of the client device.

Responsive to the compatibility data indicating a second state representing a compatible relationship for the initial phase of the compatibility workflow, an activation message is sent to the telematics device indicated by the device identifier over the wireless communication network. The activation message is operable at the telematics device to activate or continue the interaction of the telematics device with the on-board electronic system of the vehicle via the OBD link. The interaction of the telematics device with the on-board electronic system may include transfer of runtime telematics data from the on-board electronic system of the vehicle to the telematics device via the OBD link during operation of the vehicle. The account profile information may be updated to indicate the activation of the interaction of telematics device indicated by the device identifier.

A runtime phase of the compatibility workflow following the initial phase may be performed to provide an indication of compatibility or incompatibility with respect to telematics data obtained from the on-board electronic system during runtime of the vehicle. Within the runtime phase, a subsequent set of telematics data for the vehicle may be transmitted by the telematics device over a wireless communication network in which the subsequent set of telematics data includes or indicates the runtime telematics data obtained during operation of the vehicle. The runtime telematics data for the vehicle may be compared to a combined set of runtime telematics data within the vehicle profile information that was obtained from a population of vehicles of the group of vehicles of which the vehicle is a member to determine a relationship between the runtime telematics data and the combined set of runtime telematics data. The account profile information may be updated to indicate the relationship between the runtime telematics data and the combined set of runtime telematics data, and the account profile information or a portion thereof indicating the relationship may be sent to the client application operating at the client device over the wide area network for presentation to the user.

Responsive to the relationship determined between the runtime telematics data and the combined set of runtime telematics data exhibiting at least a threshold correlation with each other, the client application may be directed to present the runtime telematics data or the derivative data thereof at the client device. Responsive to the relationship determined between the runtime telematics data and the combined set of runtime telematics data not exhibiting at least the threshold correlation with each other, the client application may be directed to present an indication of incompatibility at the client device with respect to the runtime telematics data or the derivative data thereof.

Prior to the runtime phase of the compatibility workflow, predicted compatibility data may be sent to a client application operating at a client device over a wide area network for a particular pairing of a vehicle and a telematics device. The predicted compatibility data may be obtained from the vehicle profile information for the vehicle identifier that was obtained via the OBD link. The client application may present the predicted compatibility data at the client device, including an indication of compatibility and/or incompatibility with respect to each data item of a plurality of telematics data items supported by the telematics device. The predicted compatibility data may be based on previously reported sets of telematics data obtained from other telematics devices of the group of telematics devices with respective to other vehicles of the group of vehicles.

This summary describes only some of the concepts presented in greater detail by the following description and associated drawings. As such, claimed subject matter is not limited by the contents of this summary.

DETAILED DESCRIPTION

A telematics platform including a telematics service and a telematics device interfacing with an on-board electronic system of a vehicle, performs a compatibility workflow with respect to the vehicle-telematics device compatibility and data accuracy. The compatibility workflow may include multiple phases in which telematics data is assessed for compatibility or inaccuracies based on pre-established compatibility data obtained from a population of other vehicle-telematic device interactions, user-reported compatibility data, and vehicle-specific compatibility data. Incompatibility or inaccuracies in telematics data may be used to activate/deactivate or continue/discontinue interactions between the vehicle and the telematics device, and to inform users of the incompatibility of the vehicle-telematics device pair, or inaccuracies in the telematics data.

Vehicles populations are highly fragmented when it comes to the type and quality of the telematics data available from the various electronic control units and OBD interfaces of these vehicles. At times, telematics data from the OBD interface may be inaccurate or inaccuracies may arise as a result of incompatibility between a particular vehicle and a particular telematics device. It is not possible to provide a reliable user experience without knowing the degree of compatibility and accuracy of the telematics data. Given the tens of thousands of makes, models and years of vehicles on the road, it may not be practical to manually test vehicle telematics data for compatibility with a pre-defined set of fields. However, in accordance with an aspect of the present disclosure, one can determine vehicle-telematics device compatibility and/or data accuracy from crowdsourced telematics data.

By identifying incompatibility issues between a vehicle and a telematics device in real-time, a user may be notified, for example, if the incompatibility could result in damage to the vehicle or the telematics device. Furthermore, users may be notified of predicted compatibility with respect to a range of data fields supported by the telematics platform. For example, if the vehicle-telematics device pair is compatible, a user may be notified as to the amount and/or type of telematics data that can be accurately reported. Models of vehicle-telematics device compatibility may be updated based on data obtained from various sources across a population of vehicles, telematics devices, and users to provide a more accurate and more reliable resource for compatibility and accuracy information.

Figure 1:
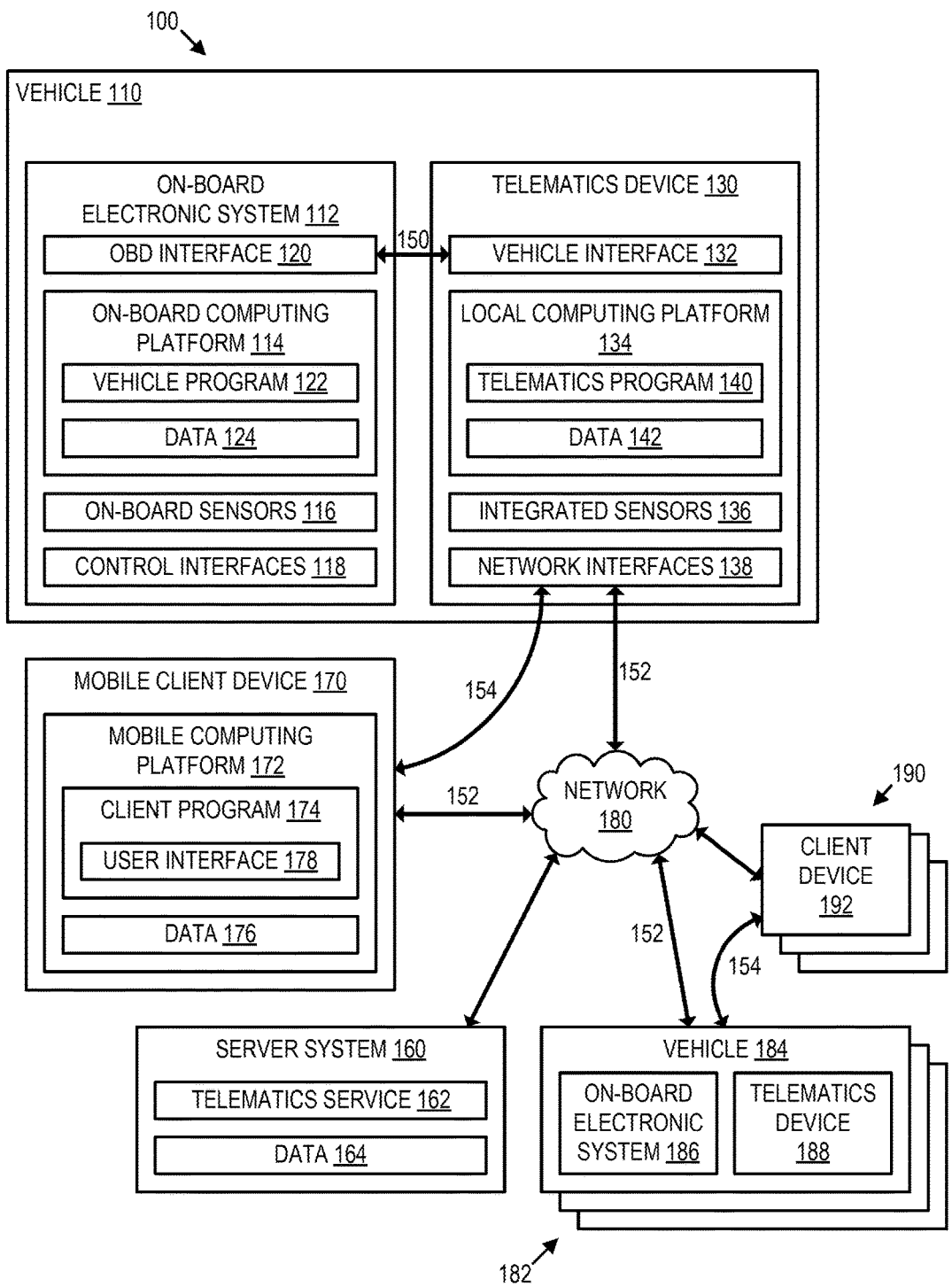
FIG. 1 is a schematic diagram depicting an example computing system.

FIG. 1 is a schematic diagram depicting an example computing system 100. Within computing system 100, a vehicle 110 includes an on-board electronic system 112 that may provide control, sensing, and diagnostics reporting with respect to the vehicle's various subsystems. On-board electronic system 112 includes an on-board computing platform 114, one or more on-board sensors 116, one or more control interfaces 118 that interface with user controls operable by a user/operator of the vehicle, and an on-board diagnostics (OBD) interface 120. On-board computing platform 114 includes a vehicle program 122 that may be implemented by the on-board computing platform, and further includes data 124 stored thereon. As an example, on-board computing platform 114 may include an engine control unit (ECU) or engine control module (ECM) of the vehicle.

Vehicle 110 may include a ride-on, road-based vehicle such as a car, truck, bus, etc. However, vehicle 110 may take a variety of forms, including a land-based wheeled, rail, or track vehicle (e.g., car, truck, bus, tractor, train, locomotive, motorcycle, four-wheeler, snowmobile, etc.), an aircraft (e.g., airplane, helicopter, etc.), a marine vessel (e.g., boat or personal watercraft), an autonomous vehicle, or other suitable vehicle type.

External devices may interface with on-board electronic system 112 via OBD interface 120. For example, a telematics device 130 may include a vehicle interface 132 that interfaces with OBD interface 120 of on-board electronic system 112 to establish an OBD link 150. In at least some implementations, telematics device 130 may take the form of an aftermarket device that is separate from the vehicle and housed within its own enclosure. Telematics device 130 may be added to or removed from vehicle 110 by an owner, operator, technician, dealer, manufacturer, etc. by connecting or disconnecting vehicle interface 132 from OBD interface 120.

OBD link 150 established between vehicle interface 132 and OBD interface 120 may take various forms, including a wired or wireless link depending on implementation. In wired implementations, vehicle interface 132 may include an electronic OBD connector having a set of electronic contacts (i.e., pins) that mates with a corresponding electronic OBD connector of OBD interface 120 having a corresponding set of electronic contacts (i.e., pins) to enable telematics device 130 to send communications to and/or receive communications from on-board electronic system 112 over the wired OBD link. In a wireless implementation, vehicle interface 132 may include a wireless transmitter and/or receiver that enables telematics device 130 to send wireless communications to and/or receive wireless communications from a wireless receiver and/or transmitter of OBD interface 120 via a wireless OBD link.

Communications between telematics device 130 and on-board electronic system 112, indicated by OBD link 150, may be unidirectional (e.g., from the on-board electronic system of the vehicle to the telematics device) or bidirectional. For example, OBD link 150 may be used to transfer data 124 or portions thereof from on-board electronic system 112 via OBD interface 120 to telematics device 130 via vehicle interface 132 where the transferred data may be processed and/or combined with other data, such as data 142. In at least some implementations, electrical power and/or an electrical ground or other electrical reference may be exchanged between on-board electronic system 112 and telematics device 130 via OBD link 150. For example, electrical power may be transferred from on-board electronic system 112 to telematics device 130 over link 150 to power the telematics device. However, in other examples telematics device 130 may contain its own power source.

Telematics device 130 may include a local computing platform 140, one or more integrated sensors 136, and one or more network interfaces 138. Local computing platform 134 includes a telematics program 140 that may be implemented by the local computing platform, and further includes data 142 stored thereon. Local computing platform 134, by executing telematics program 140, may be programmed/configured to perform a compatibility workflow or portions thereof. Network interfaces 138 may include a wireless communication interface by which the telematics device communicates with a telematics service 162 via a wireless communication network component of communication network 180. Aspects of the compatibility workflow may be performed by telematics service 162.

Computing system 100 may further include a server system 160 that hosts telematics service 162 that may be implemented by the server system, and data 164 stored thereon. Telematics service 162 may include one or more programs executed by server system 160. However, in other implementations, telematics service 162 or portions thereof may reside at or within telematics program 140 of telematics device 130. For example, the compatibility workflow described herein may be performed entirely at and by telematics device 130, or may be distributed across telematics device 130 and server system 160.

Computing system 100 may further include one or more client computing devices (i.e., client devices), such as a mobile client device 170. Mobile client device 170 includes a mobile computing platform 172. Mobile computing platform 172 may include a client program 174 that may be implemented by the mobile computing platform, and further includes data 176 stored thereon. Client program 174 may include a user interface 178 through which a user may interact with client program 174. In at least some implementations, client program 174 may take the form of a client application.

Computing system 100 may further include a population of vehicles 182 of which vehicle 184 is an example. Vehicle 184 similarly includes an on-board electronic system 186 interfacing with a telematics device 188 via an OBD link, as previously described with reference to vehicle 110. This vehicle population may include many vehicles, and may refer to the entire domain of vehicles serviced by telematics service 162. For example, this vehicle population may include tens, hundreds, thousands, millions, or more vehicles. Telematics devices 130 and 188 are members of a population of telematics devices interfacing with respective vehicles of the population of vehicles 182. For example, upon telematics device 130 establishing OBD link 150 with on-board electronic system 112 and/or reporting interaction with vehicle 110 to telematics service 162, vehicle 110 may join the population of vehicles 182.

Computing system 100 may further include a population of client devices 190 operated by respective users of which client device 192 is an example. This population of client devices may include many client devices, and may refer to the entire domain of client devices serviced by telematics service 162. Client device 192 may include a mobile client computing device or non-mobile computing devices. Each client device of this client device population may include a respective instance of previously described client program 174, which may register with telematics service 162 and/or a telematics device (e.g., 130, 188, etc.). For example, upon client program 174 registering with telematics service 162, mobile client device 170 may join the population of client devices 190.

The various components of computing system 100 may communicate with each other over communication network 180. For example, communications between telematics devices and server system 160 or client devices may be over a wireless communication network component of communications network 180. Mobile client devices may also utilize wireless communication network components to communicate with other components of computing system 100. Within FIG. 1, examples of wireless communication links are depicted by reference numeral 152, which may terminate at wireless access points of network 180 before traversing wired communication links to server system 160 or client devices. Communication network 180 may include a wide area network (WAN) such as the Internet or a portion thereof, one or more local area networks (LANs), and/or one or more personal area networks (PANs), depending on implementation. Alternatively or additionally, telematics devices may communicate directly with mobile client devices via a wireless local area network or wireless personal area network indicated by reference number 154.

Data 124 residing at on-board electronic system 112 may include sensor data obtained or otherwise derived from sensor signals generated by on-board sensors 116 of the on-board electronic system, error codes or other data items generated by vehicle program 122, a vehicle identifier (e.g., a vehicle identification number (VIN)) of vehicle 110, a software version identifier of vehicle program 122, or other suitable information. Data 142 residing at local computing platform 134 may include sensor data obtained or otherwise derived from sensor signals generated by integrated sensors 136 of the telematics device, error codes or other data items generated by telematics program 140, a device identifier of the telematics device, a software version identifier of telematics program 140, a client identifier of a client device and/or client program registered with the telematics device, a user identifier of a user registered with the telematics device, raw and/or processed forms of data obtained from on-board electronic system 112 via OBD link 150, raw and/or processed forms of data obtained from telematics service 162, raw and/or processed forms of data obtained from a client device, user-defined settings, or other suitable information. Data 164 residing at server system 160 may include raw and/or processed forms of data obtained from telematics devices (e.g., telematics device 130), on-board electronic systems of vehicles (e.g., on-board electronic system 112) via telematics devices, client devices (e.g., mobile client device 170), or other suitable information. Data 176 residing at mobile client device 170 may include raw and/or processed forms of data obtained from telematics device 130, on-board electronic system 112 of vehicle 110 via telematics device 130, and/or telematics service 162, or other sources, and may further include user-defined settings, a client identifier of the client device and/or client program, a user identifier of the client device, a device identifier of the telematics device with which the client program is registered, etc.

Figure 2:
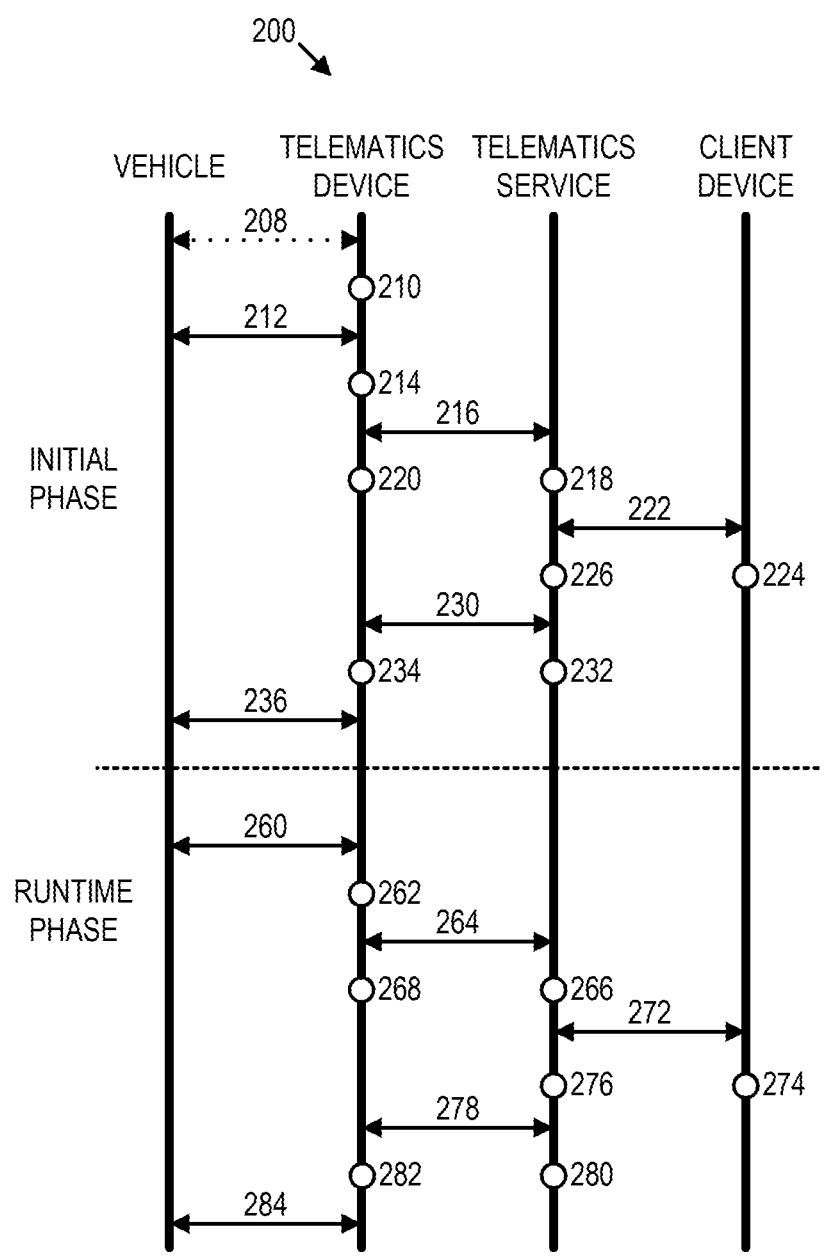
FIG. 2 is a flow diagram depicting an example compatibility workflow.

FIG. 2 is a flow diagram depicting an example compatibility workflow 200 involving interactions between components of a computing system, including a telematics device, an on-board electronic system of a vehicle, a telematics service, and a client device. Each of these components may correspond to the previously described example computing system 100 of FIG. 1, including telematics device 130, on-board electronic system 112 of vehicle 110, telematics service 162, and mobile client device 170, as a non-limiting example.

Within FIG. 2, communications between the telematics device and the on-board electronic device of the vehicle may be over an OBD link, communications between the telematics device and the telematics service may be over at least a wide area network (WAN) having a wireless component, and communication between the telematics service and the client device may be over at least a wide area network (WAN). In at least some implementations, the telematics device and the client device may communicate with each other over a personal area network (PAN) or a local area network (LAN) having a wireless component.

Within FIG. 2, operations 208-236 may be associated with an initial phase of compatibility workflow 200, and operations 260-284 may be associated with a subsequent, runtime phase of compatibility workflow 200. At 208, a vehicle interface of the telematics device may be physically connected to an OBD interface of the on-board electronic system of the vehicle, thereby enabling the telematics device to communicate with the vehicle, for example, by exchanging electrical power/ground (i.e., electrical communications) and/or by exchanging data (i.e., data communications).

Upon connection of the telematics device to the on-board electronic system of the vehicle, the telematics device performs a set of operations at 210, including initiating the initial phase of the compatibility workflow. At 212, the telematics device and the on-board electronic system of the vehicle exchange electrical communications and/or data communications with each other. In at least some implementations, operation 212 may correspond to establishing an OBD link by the vehicle and telematics device communicating with each other according to a communication protocol, such as an OBD-compliant protocol using an OBD-compliant protocol layer. However, in other implementations, operation 212 may correspond to an initial connection established prior to establishing the OBD link. Here, for example, the telematics device may measure electrical properties of the electrical communications with the vehicle and/or obtain data associated with other non-OBD protocol layers. This pre-OBD protocol processing may be used to limit damage to the vehicle and/or telematics device by determining compatibility prior to establishing a formal OBD link using an OBD-compliant protocol.

At 214, the telematics device performs a set of operations based on the electrical communications and/or data communications exchanged at 212. An exchange of electrical communications may include the exchange of electrical power and/or electrical ground reference on one or more pins across a pair of electrical connectors of the OBD and vehicle interfaces. An exchange of electrical communications may be bidirectional or unidirectional depending on implementation. An exchange of data communications may include the exchange of one or more messages formatted according to a protocol, and may be bidirectional or unidirectional depending on implementation.

Examples of operations that may be performed based on electrical communications may include measuring properties of the electrical communications (e.g., voltage, current, impedance, power, etc.) to obtain data representing the measurements, processing the electrical communications to obtain a processed form thereof, using or storing electrical energy of the electrical communications or a processed form thereof, determining one or more additional operations to be performed (e.g., initiating data communications with another device, continuing electrical and/or data communications within another device, discontinuing electrical and/or data communications with another device, initiating an output via an output subsystem of the device), etc.

Examples of operations that may be performed based on data communications may include gathering, storing, and processing data contained in one or more messages, determining one or more additional operations to be performed based on the data or processed forms thereof (e.g., initiating data communications with another device, continuing electrical and/or data communications with another device, discontinuing electrical and/or data communications with another device, initiating an output via an output subsystem of the device), etc.

At 216, the telematics device and the telematics service may exchange data communications with each other. The data communications exchanged at 216 may include data originating from the vehicle and/or data originating from the telematics device that is sent from the telematics device to the telematics service, and/or data originating from the telematics service and/or data originating from the client application operating at the client device that is sent from the telematics service to the telematics device. At 218, the telematics service may perform a set of operations based on the data communications exchanged at 216. For example, the telematics service may initiate data communications with the client application operating at the client device. At 220, the telematics device may perform a set of operations based on the data communications exchanged at 216. For example, the telematics device may initiate electrical communications and/or data communications with the on-board electronic system of the vehicle (e.g., as indicated at 236), and/or may initiate data communications with the client application operating at the client device.

At 222, the telematics service and a client application operating on the client device may exchange data communications with each other. The data communications exchanged at 222 may include data originating from the vehicle and/or data originating from the telematics device and/or data originating from the telematics service that is sent from the telematics service to the client application, and/or data originating from the client application (e.g., user input) that is sent from the client device to the telematics service. At 224, the client application operating at the client device may perform a set of operations based on the data communications exchanged at 222. At 226, the telematics service may perform a set of operations based on the data communications exchanged at 222.

At 230, the telematics device and the telematics service may again exchange data communications with each other. Again, the data communications exchanged at 230 may include data originating from the vehicle and/or data originating from the telematics device that is sent from the telematics device to the telematics service, and/or data originating from the telematics service and/or data originating from the client application operating at the client device that is sent from the telematics service to the telematics device. At 232, the telematics service may perform another set of operations based on the data communications exchanged at 230. At 234, the telematics device may perform another set of operations based on the data communications exchanged at 230. For example, the telematics device may initiate electrical communications and/or data communications with the on-board electronic system of the vehicle (e.g., as indicated at 236), and/or may initiate data communications with the client application operating at the client device.

At 236, the telematics device and the on-board electronic system of the vehicle may again exchange electrical communications and/or data communications with each other. The electrical communications and/or data communications sent from the telematics device to the on-board electronic system of the vehicle may originate from one or more of the telematics device, the telematics service, and/or the client application.

Within the runtime phase of the compatibility workflow 200, at 260, the telematics device and the on-board electronic system of the vehicle may again exchange electrical communications and/or data communications with each other. At 262, the telematics device may perform another set of operations based on the electrical communications and/or data communications exchanged at 260.

At 264, the telematics device and the telematics service may again exchange data communications with each other. Again, the data communications exchanged at 264 may include data originating from the vehicle and/or data originating from the telematics device that is sent from the telematics device to the telematics service, and/or data originating from the telematics service and/or data originating from the client application operating at the client device that is sent from the telematics service to the telematics device. At 266, the telematics service may perform a set of operations based on the data communications exchanged at 264. For example, the telematics service may initiate data communications with the client application operating at the client device. At 268, the telematics device may perform a set of operations based on the data communications exchanged at 264. For example, the telematics device may initiate electrical communications and/or data communications with the on-board electronic system of the vehicle (e.g., as indicated at 284), and/or may initiate data communications with the client application operating at the client device.

At 272, the telematics service and a client application operating on the client device may exchange data communications with each other. Again, the data communications exchanged at 278 may include data originating from the vehicle and/or data originating from the telematics device and/or data originating from the telematics service that is sent from the telematics service to the client application, and/or data originating from the client application (e.g., user input) that is sent from the client device to the telematics service. At 274, the client application operating at the client device may perform a set of operations based on the data communications exchanged at 272. At 276, the telematics service may perform a set of operations based on the data communications exchanged at 272.

At 278, the telematics device and the telematics service may again exchange data communications with each other. Again, the data communications exchanged at 278 may include data originating from the vehicle and/or data originating from the telematics device that is sent from the telematics device to the telematics service, and/or data originating from the telematics service and/or data originating from the client application operating at the client device that is sent from the telematics service to the telematics device. At 280, the telematics service may perform another set of operations based on the data communications exchanged at 278. At 282, the telematics device may perform another set of operations based on the data communications exchanged at 278. For example, the telematics device may initiate electrical communications and/or data communications with the on-board electronic system of the vehicle (e.g., as indicated at 284), and/or may initiate data communications with the client application operating at the client device.

At 284, the telematics device and the on-board electronic system of the vehicle may again exchange electrical communications and/or data communications with each other. Again, the electrical communications and/or data communications sent from the telematics device to the on-board electronic system of the vehicle may originate from one or more of the telematics device, the telematics service, and/or the client application.

In at least some implementations, data communications between the telematics device and the telematics service may traverse the client device as an intermediate entity. For example, the telematics device may instead exchange data communications with the client application of the client device, which in turn exchanges data communications with the telematics service. The client device, as an intermediate entity, may receive data communications from the telematics device and/or telematics service, store, process, and forward the data communications or processed forms thereof to another of the telematics device or telematics service. In these implementations, the client device may communicate with the telematics device over a personal area network (PAN) or local area network (LAN), and the telematics service may communicate with the client device via a wide area network (WAN).

Figure 3:
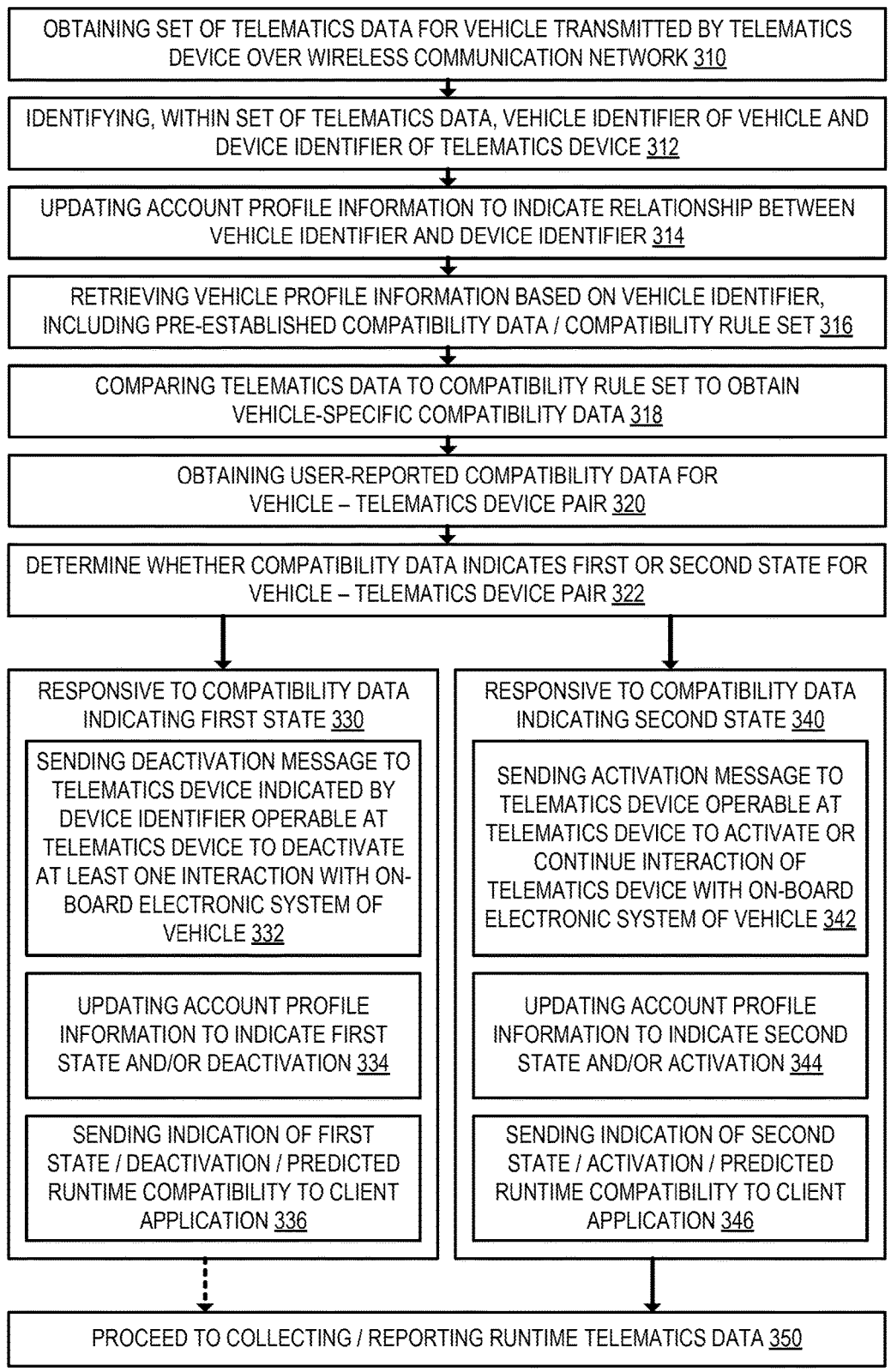
FIG. 3 is a flow diagram depicting an example method of performing an initial phase of a compatibility workflow by e.g., a telematics service.

FIG. 3 is a flow diagram depicting an example method of performing an initial phase of a compatibility workflow. In an example, method 300 or portions thereof may be performed by a computing system implementing a telematics service, such as telematics service 162 executed by server system 160 of FIG. 1. However, in at least some implementations, method 300 or portions thereof may be performed locally at the telematics device by the telematics program executed by the local computing platform. Furthermore, in at least some implementations, method 300 or portions thereof may be performed at a client device of a user by an application program executed by the computing platform of that device. Accordingly, in at least some implementations, method 300 may be performed exclusively by the telematics service, exclusively by the telematics device, exclusively by the client device, or may be distributed across two or more of the telematics service, the telematics device, and/or the client device. In view of these various implementations, method 300 will be described primarily with reference to the telematics service, being remotely located from the telematics device and client device, performing method 300.

At 310, the method includes obtaining a set of telematics data for a vehicle transmitted by a telematics device over a wireless communication network. As previously described, the telematics device may interface with an on-board electronic system of the vehicle via an on-board diagnostics (OBD) link. The set of telematics data obtained at 310 may correspond to an initial set of telematics data that is obtained prior to collecting and/or reporting subsequent telematics data that includes runtime telematics data, for example.

The set of telematics data obtained at 310 may include a vehicle identifier of the vehicle, such as a vehicle identification number (VIN). A VIN, for example, may include a 17-digit number that uniquely identifies a vehicle, including a manufacturer identifier (e.g., make), vehicle attributes/general characteristics (e.g., model) (e.g., via a vehicle descriptor section), vehicle year, production plant, and other uniquely identifying information specific to the vehicle (e.g., a unique ID component of a vehicle-specific identifier section of the VIN). Accordingly, the vehicle identifier described herein may indicate general information and specific information. The general information may be used, for example, to identify one or more groups of vehicles of which the vehicle is a member. For example, the vehicle may be a member of a first group of vehicles of a particular manufacturer, a second group of vehicles of a particular model (e.g., as a subset of the first group), a group of vehicles of a particular year of production (e.g., as a subset of the first group and/or second group), and other vehicle groups (e.g., based on firmware version) depending on implementation and the level of granularity of the vehicle identifier. The vehicle identifier or portions thereof may be linked to pre-established vehicle information stored within a publicly accessible database system that may be accessed by the telematics service. Additionally or alternatively, the vehicle identifier or portions thereof may be linked to pre-established vehicle information (e.g., vehicle profile information), including vehicle-telematics device compatibility data established by the telematics service from telematics data obtained from a population of other telematics devices.

The telematics data obtained at 310 may further include a device identifier of the telematics device that transmitted the telematics data. The device identifier may include or may be based on a hardware identifier and/or a program identifier (e.g., software or firmware identifier). The device identifier may be linked to pre-established device information stored within a database system accessible to the telematics service. In at least some implementations, the telematics service may be owned or operated by the same entity that manufactures or sells the telematics device or the telematics program executed by the telematics device.

In at least some implementations, the set of telematics data may further indicate one or more of the following: (1) one or more pinout values measured across a connector of the OBD link, (2) one or more error messages reported by the on-board electronic system to the telematics device via the OBD link, (3) one or more failed attempts by the telematics device to pair with the on-board electronic system via the OBD link using an OBD-compliant protocol, or other suitable data. As previously described with reference to communications at 212 of FIG. 2, the set of telematics data obtained at 310 may, in at least some implementations, include data associated with electrical and/or data communications prior to formally establishing an OBD link on an OBD-compliant protocol layer.

At 312, the method includes identifying, within the set of telematics data, a vehicle identifier of the vehicle and a device identifier of the telematics device. However, in at least some implementations, the device identifier may be omitted, such as where an identity of the telematics device is inferred from context. For example, the telematics service may identify a telematics device based on state information associated with an established communications session between the telematics service and the telematics device.

At 314, the method includes updating account profile information to indicate a relationship between the vehicle identifier and the device identifier. For example, the vehicle identifier and device identifier may be associated with each other by storing the identifiers or derivatives thereof within an account profile containing the account profile information within a database system. In at least some implementations, a vehicle profile may be created for the vehicle and/or a device profile may be created for the telematics device that includes the vehicle identifier and device identifier. Other data items of the telematics data received from the telematics device or derived from the telematics data for the vehicle may also be associated with the vehicle identifier and/or the device identifier within the account profile information of the account profile at the database system. Furthermore, a user identifier that identifies a user registered with the telematics service may be associated with the account profile, thereby enabling the telematics service to establish a relationship between or among a user, a telematics device, and a vehicle. The user may access the account profile information by logging into a session of the telematics service using their user identifier, for example.

At 316, the method includes retrieving vehicle profile information for a group of vehicles of which the vehicle is a member based on the vehicle identifier. The vehicle profile information may include compatibility data for the group of vehicles with respect to a group of telematics devices of which the telematics device indicated by the device identifier is a member. The compatibility data for the group of vehicles may be referred to as pre-established compatibility data. The pre-established compatibility data may take various forms. In an example, the pre-established compatibility data may provide a binary indication of whether a vehicle of the group of vehicles is compatible or incompatible with a telematics device of the group of telematics devices. Here, for example, the binary indication may be represented by one or more data items, the presence within or the omission from the pre-established compatibility data, indicates a compatible state or an incompatible state with respect to a vehicle-telematics device pair. In another example, the pre-established compatibility data may provide three or more gradations on incompatibility, which may be represented by corresponding data items within the pre-established compatibility data. Here, for example, a compatible state (e.g., fully compatible), incompatible, and/or one or more partially compatible states may be indicated by the pre-established compatibility data for the vehicle-telematics device pair. Furthermore, compatibility states may be determined individually for each of a plurality of data fields having corresponding data items within the telematics data or derivate data thereof. This plurality of data fields may include any or all of the data fields reported by the vehicle to the telematics device and any or all of the data fields supported by the telematics device or telematics service.

Additionally or alternatively, the vehicle profile information may include a compatibility rule set for the group of vehicles with respect to the group of telematics devices of which the telematics device is a member. The compatibility rule set may be used to determine and obtain vehicle specific compatibility data based on telematics data reported for the particular vehicle, such as previously described above with respect to telematics data beyond the vehicle identifier and device identifier. Here, for example, at 318, the method includes comparing the telematics data to the compatibility rule set to obtain vehicle-specific compatibility data. In contrast to the pre-established compatibility data of the group of vehicles, the vehicle-specific compatibility data may be based on the specific telematics data reported for the vehicle. The vehicle-specific compatibility data may indicate one or more compatibility states, such as previously described with respect to the pre-established compatibility data. For example, the vehicle-specific compatibility data may provide a binary indication of a compatible state or an incompatible state, or may provide an indication of three or more compatibility states. Furthermore, compatibility states may be determined individually for each of a plurality of data fields having corresponding data items within the telematics data or derivate data thereof. This plurality of data fields may include any or all of the data fields reported by the vehicle to the telematics device and any or all of the data fields supported by the telematics device or telematics service. As a non-limiting example, a compatibility rule sent may include one or more rules for each data field of a plurality of data fields against which the vehicle-specific telematics data or derivative data thereof may be compared in accordance with the one or more rules to obtain a corresponding compatibility state for that data field. Each rule, for example, may define one or more thresholds against which a data item is compared to enable the telematics service to select a particular compatibility state from among two or more available compatibility states for that data field. These thresholds may be selected by the telematics service based on statistical analysis of a sample of telematics data obtained from other vehicles of the vehicle group.

Additionally or alternatively, at 320, user-reported compatibility data may be obtained for the vehicle-telematics device pair indicated by the vehicle identifier and device identifier. Here, for example, a user may report compatibility issues observed by the user by providing a user input to the client application operating at the client device. The client application may transmit data indicating the user input or a processed form thereof to the telematics service. For example, a user may report that a headlight of the vehicle requires replacement even though an error code was not detected by the telematics device as being output by the on-board electronic system of the vehicle. Conversely, the user may report that the headlight of the vehicle does not require replacement (i.e., is properly functioning) even though an error code was detected by the telematics device as being output by the on-board electronic system of the vehicle.

At 322, the method includes determining whether the compatibility data indicates a first or a second state of compatibility with respect to the vehicle—telematics device pair. Here, the compatibility data may include one, some, or all of the pre-established compatibility data, the vehicle-specific compatibility data, and/or the user-reported compatibility data. For example, the compatibility data for the group of vehicles with respect to the group of telematics devices may be based, at least in part, on a plurality of previously reported sets of telematics data for other vehicles. These previously reported sets of telematics data may be similarly obtained from a plurality of telematics devices of the group of telematics devices over wireless communication networks in which each of the plurality of telematics devices interface with a respective on-board electronic system of a respective vehicle of the group of vehicles via a respective OBD link. Additionally or alternatively, the compatibility data for the group of vehicles may be based, at least in part, on a plurality of user-reported compatibility issues (as indicated by the user-reported compatibility data) received as user input directed at a respective client application of a respective client device of a user, and may be obtained from each of the client devices over a communication network.

At 330, the method includes performing one or more sub-processes responsive to the compatibility data indicating a first state of compatibility. For example, at 322, the method includes sending a deactivation message to the telematics device indicated by the device identifier over the wireless communication network. The deactivation message is operable at the telematics device to deactivate at least one interaction of the telematics device with the on-board electronic system of the vehicle via the OBD link. For example, the deactivation message may be operable at the telematics device to deactivate an OBD-compliant protocol layer or other protocol layer used to communicate over the OBD link or physical connection to deactivate the interaction of the telematics device with the on-board electronic system of the vehicle via the OBD link.

In at least some implementations, the telematics platform comprising the telematics service and the telematics device may support a plurality of different interactions, each interaction of which may be independently deactivated or activated depending on compatibility. For example, each data field supported by the telematics platform over the OBD link may have a corresponding interaction that may be independently activated or deactivated based on compatibility or accuracy of the data. Additionally or alternatively, non-OBD protocol-specific interactions, such as electrical communications may be independently activated or deactivated based on compatibility.

As another example, at 334, the method includes updating the account profile information to indicate the first state of compatibility and/or deactivation of the interaction of the telematics device indicated by the device identifier. In at least some implementations, specific data items may be used to indicate compatibility states and/or deactivation of the interaction. As previously described, a plurality of interactions may be supported by the telematics platform in which each of the plurality of interactions may be independently activated or deactivated. Within this context, the account profile information may be updated on a per data field basis or other interaction type to indicate the compatibility state and/or the deactivation/activation with respect to that item.

As yet another example, at 336, the method includes sending the account profile information or a portion thereof indicating the first state and/or the deactivation to a client application operating at a client device over a wide area network. The indication of the first state and/or the deactivation may be presented by the client application at the client device. For example, the indication of the first state and/or the deactivation may be operable at the client application to present a user instruction to disconnect the telematics device from the on-board electronic system of the vehicle. Following presentation of the user instruction, the user of the client device may optionally disconnect the telematics device from the on-board electronic system of the vehicle to physically terminate the OBD link.

At 340, the method includes performing one or more sub-processes responsive to the compatibility data indicating a second state of compatibility. For example, at 342, the method includes sending an activation message to the telematics device indicated by the device identifier over the wireless communication network. The activation message may be operable at the telematics device to activate or continue the interaction of the telematics device with the on-board electronic system of the vehicle via the OBD link. This interaction may include a subsequent runtime phase in which runtime telematics data is transferred from the on-board electronic system of the vehicle to the telematics device via the OBD link during operation of the vehicle.

As another example, at 344, the method includes updating the account profile information to indicate the second state of compatibility and/or the activation of the interaction of telematics device indicated by the device identifier. As yet another example, at 346, the method may include sending an indication of the second state of compatibility and/or the activation of the interaction to the client application operating at the client device over the wide area network. The indication of the second state and/or the activation of the interaction may be presented by the client application at the client device. As previously described, operation 340 or the sub-processes thereof may be performed on a per data field/interaction basis across some or all of the data fields and interactions supported by the telematics platform.

In at least some implementations, predicted compatibility data may be provided to a client device of a user associated with the telematics device. For example, at 336 and/or 346, the method may further include sending predicted compatibility data to the client application operating at the client device over the wide area network. The predicted compatibility data may be obtained from the vehicle profile information for the vehicle identifier as previously described at 316. Here, the predicted compatibility data of the vehicle profile information may take the form of pre-established compatibility data. For example, the predicted compatibility data may be based, at least in part, on a plurality of previously reported sets of telematics data obtained from a plurality of telematics devices of the group of telematics devices over wireless communication networks in which each of the plurality of telematics devices interface with a respective on-board electronic system of a respective vehicle of the group of vehicles via a respective OBD link. Alternatively or additionally, the predicted compatibility data may be based, at least in part, on a plurality of user-reported compatibility issues received as user input directed at a respective client application of a respective client device of a user, and may be obtained from each of the client devices over a communication network (e.g., a wide area network). The client application may present the predicted compatibility data at the client device. For example, the client application may present an indication of compatibility and/or incompatibility with respect to each data field/data item of a plurality of telematics data field/data items supported by the telematics platform, including the telematics service and/or telematics device.

From 340, the process flow may proceed to 350, collecting and/or reporting runtime telematics data, for example, as further described with reference to FIG. 4. In at least some implementations, the process flow does not proceed to 350 from 330 responsive to the compatibility data indicating the first state of compatibility. For example, deactivation of the interaction between the telematics device and the on-board electronic system of the vehicle responsive to the deactivation message sent at 332 and/or removal of the telematics device from the OBD interface of the vehicle responsive to presentation of the indication of the deactivation/first state of incompatibility to the user at 336 may discontinue all further activity of the telematics device with respect to the vehicle. Accordingly, the process flow may terminate in at least some implementations responsive to the first state of compatibility.

Figure 4:
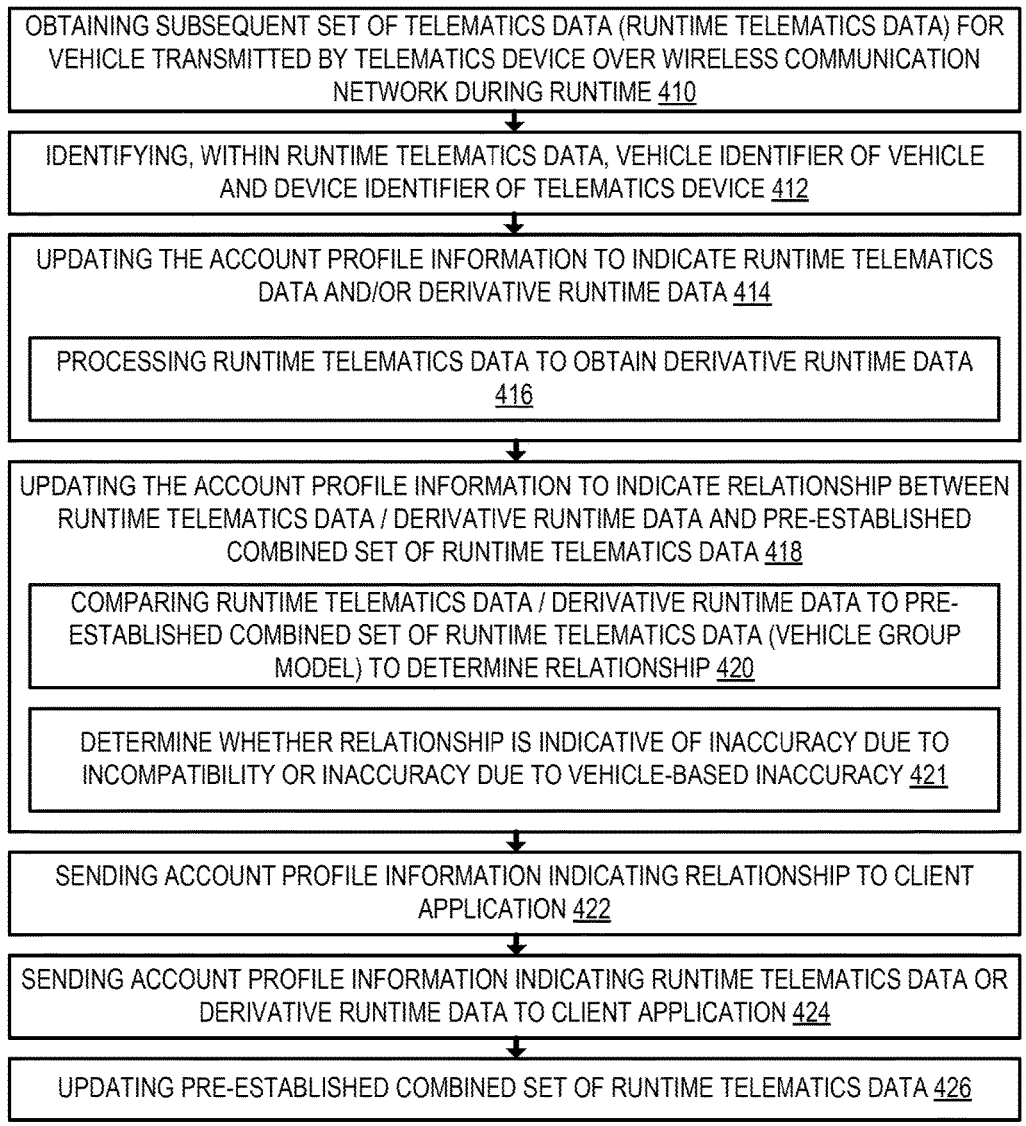
FIG. 4 is a flow diagram depicting an example method of performing a runtime phase of a compatibility workflow by e.g., a telematics service.

FIG. 4 is a flow diagram depicting an example method 400 of performing a runtime phase of a compatibility workflow. In an example, method 400 or portions thereof may be performed by a computing system implementing a telematics service, such as telematics service 162 executed by server system 160 of FIG. 1. However, in at least some implementations, method 400 or portions thereof may be performed locally at the telematics device by the telematics program executed by the local computing platform. Furthermore, in at least some implementations, method 400 or portions thereof may be performed at a client device of a user by an application program executed by the computing platform of that device. Accordingly, in at least some implementations, method 400 may be performed exclusively by the telematics service, exclusively by the telematics device, exclusively by the client device, or may be distributed across two or more of the telematics service, the telematics device, and/or the client device. In view of these various implementations, method 400 will be described primarily with reference to the telematics service, being remotely located from the telematics device and client device, performing method 400.

At 410, the method includes obtaining a subsequent set of telematics data for the vehicle transmitted by the telematics device over a wireless communication network. The subsequent set of telematics data may include or indicate runtime telematics data obtained by the telematics device from the on-board electronic system of the vehicle via the OBD link during operation of the vehicle. In at least some implementations, the runtime telematics data includes two or more telematics data items. As a non-limiting example, the runtime telematics data may include tens, hundreds, thousands, or more telematics data items for corresponding data fields.

At 412, the method includes identifying, within the subsequent set of telematics data, the vehicle identifier of the vehicle and the device identifier of the telematics device. However, in at least some implementations, the device identifier may be omitted, such as where an identity of the telematics device is inferred from context as previously described with reference to FIG. 3.

At 414, the method includes updating the account profile information to indicate the runtime telematics data or derivative data thereof (i.e., derivative runtime data). For example, as a sub-process of operation 414, the runtime telematics data may be processed at 416 to obtain derivative runtime data. The derivative runtime data may, for example, take the form of a combination of runtime telematics data obtain over a period of time and/or across multiple sessions of use of the vehicle. The vehicle identifier and/or the device identifier may be used to associate the runtime telematics data and/or derivative runtime data with the corresponding account profile. Updating the account profile information may include storing or adding the runtime telematics data or derivative runtime data in or to the account profile information.

At 418, the method includes further updating the account profile information to indicate the relationship between the runtime telematics data/the derivative runtime data and a pre-established combined set of runtime telematics data. As previously described with reference to method 300 of FIG. 3, vehicle profile information for a group of vehicles may be referenced based on the vehicle identifier. The pre-established combined set of runtime telematics data may be stored within the vehicle profile information that was obtained from a population of vehicles of the group of vehicles of which the vehicle is a member.

As a sub-process of operation 418, at 420, the method may include comparing the runtime telematics data and/or the derivative runtime data for the vehicle to the pre-established combined set of runtime telematics data to determine a relationship between the pre-established combined set of runtime telematics data and the runtime telematics data and/or the derivative runtime data. The pre-established combined set of runtime telematics data may be referred to as a vehicle group model. Operations 418 and 420 may be performed for each data item of the runtime telematics data or derivative runtime data to obtain a respective relationship for each data item of the runtime telematics data or derivative runtime data. For example, tens, hundreds, thousands, or more relationships may be obtained for a set of telematics data obtained for the vehicle at 410 from the telematics device. The vehicle group model may include pre-established combined runtime data for each data item, thereby enabling the various data items for the vehicle to be compared to the vehicle group model.

In at least some implementations, the method may include an operation 421 in which the relationship is determined to be indicative of either an inaccuracy of the data due to incompatibility between the vehicle and the telematics device, or an inaccuracy of the data due to a vehicle-based inaccuracy that is not the result of incompatibility between the vehicle and the telematics device (i.e., an inaccuracy in the data introduced by the vehicle independent of the telematics device). Inaccuracy caused by incompatibility may be distinguishable from inaccuracy not caused by incompatibility based on the pre-established compatibility data and the vehicle group models, for example. Within this context, for example, if no (or a statistically small proportion) of other vehicles of the vehicle group have experienced incompatibility for the same data item or combination of data items with respect to telematics devices of the device group, then the inaccuracy may be determined to be related to an inaccuracy introduced by the vehicle that is not necessarily due to incompatibility. Conversely, if all (or a statistically large or significant proportion) of other vehicles of the vehicle group have experienced incompatibility for the same data item or combination of data items with respect to telematics devices of the device group, then the inaccuracy may be determined to be related to incompatibility between the vehicle and the telematics device.

Operations performed at 420, 421, and 322 of FIGS. 3 and 4 may involve the combination and use of data from various sources. A vehicle group-specific rule set implemented by the telematic service may be used to determine how such data is combined and used. For example, a set of rules may be used to determine acceptable values for data fields given a specific make, model and year of the vehicle, as well as vehicle specifics (e.g. fuel type, engine size, vehicle weight). The telematics service may, for example, provide automated compatibility by field organized by make, model and year based on the telematics data. The telematics service may, for example, provide automated compatibility organized by individual VIN that overrides make, model, and year based on telematics data. The telematics service may, for example, provide automated compatibility that would include a confidence score indicating how well the data fits the defined rules. The telematics service may, for example, provide compatibility organized by make, model, year which is overridden by a curator, such as a user or administrator. The telematics service may, for example, provide compatibility organized by individual VIN that is overridden by a curator, such as a user or administrator.

At 422, the method includes sending the account profile information or a portion thereof indicating the relationship to the client application operating at the client device over the wide area network. The indication of the relationship between the pre-established combined set of runtime telematics data and the runtime telematics data/the derivative runtime data may be presented to the user at the client device by the client application. The indication of the relationship may further indicate whether inaccuracy of a data item is likely due to incompatibility between the vehicle and the telematics device, or a vehicle-based inaccuracy.

At 424, the method optionally includes sending the account profile information or a portion thereof indicating the runtime telematics data or the derivative data thereof to the client application operating at the client device over the wide area network. As a first example, the method may include, responsive to the relationship determined between the runtime telematics data/derivative runtime data and the pre-established combined set of runtime telematics data exhibiting at least a threshold correlation with each other, operation 424 may be performed and the client application may be directed to present the runtime telematics data or the derivative runtime data at the client device.

As a second example, the method may include, responsive to the relationship determined between the runtime telematics data/derivative runtime data and the pre-established combined set of runtime telematics data not exhibiting at least the threshold correlation with each other, directing the client application to present an indication of incompatibility at the client device with respect to the runtime telematics data or the derivative runtime data without sending the runtime telematics data or the derivative runtime data to or without presenting such data at the client device/client application.

Figure 6:
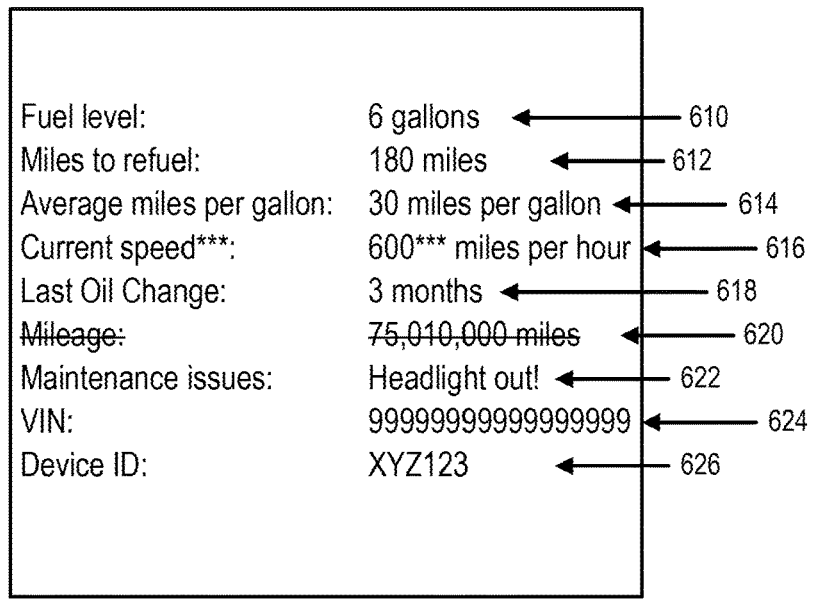
FIG. 6 depicts an example graphical user interface of a client application operating at a client device.

Sending the account profile information or a portion thereof indicating the relationship to the client application at 422 may include sending an indication of each relationship for each data item of the runtime telematics data or derivative runtime data. The client application may, for example, present an indication of each relationship for each data item at the client device as either a compatible or incompatible data item based on its respective relationship to the combined set of runtime telematics data. FIG. 6 depicts a non-limiting example of a graphical user interface presenting an indication of compatible or incompatible data items for a plurality of data items. Similarly, sending the account profile information or a portion thereof indicating the runtime telematics data or derivative runtime data to the client application may be performed on a per data item basis, and may include sending only those data items that have a relationship that exhibits at least the threshold correlation. Similarly, presenting the account profile information or a portion thereof indicating the runtime telematics data or derivative runtime data at the client application may be performed on a per data item basis, and may include presenting only those data items that have a relationship that exhibits at least the threshold correlation.

At 426, the method includes combining the runtime telematics data with the pre-established combined set of runtime telematics data to obtain an updated combined set of telematics data. The updated combined set of telematics data may be stored within the vehicle profile information at a database system of or accessible to the telematics service.

Incompatibility or other inaccuracies in telematics data obtained by a telematics device for a vehicle may be further identified based on sensor data originating from sensors of the telematics device. In at least some implementations, the subsequent set of telematics data for the vehicle obtained at 410 may further include device-originating telematics data obtained from one or more sensors integrated with the telematics device. In this example, the method may further include comparing time-contemporaneous features of the device-originating telematics data to the runtime telematics data to determine a relationship between the device-originating telematics data and the runtime telematics data. Within this context, the method may further include updating the account profile information to indicate the relationship determined between the device-originating telematics data and the runtime telematics data. For example, a comparison may be used to determine whether a data field reported by the vehicle (e.g., vehicle speed) is accurate based on GPS and/or inertial sensor data obtained from sensors on-board the telematics device. The method may further include sending the account profile information or a portion thereof indicating this relationship to the client application operating at the client device over the wide area network, thereby indicating whether the data is accurate based on the above comparison. The method may further include updating the vehicle profile information based on the relationship determined between the device-originating telematics data and the runtime telematics data. The updated vehicle profile information may be stored at a database system of or accessible to the telematics service, thereby enabling the telematics platform to track and further resolve which data fields are accurate.

Figure 5:
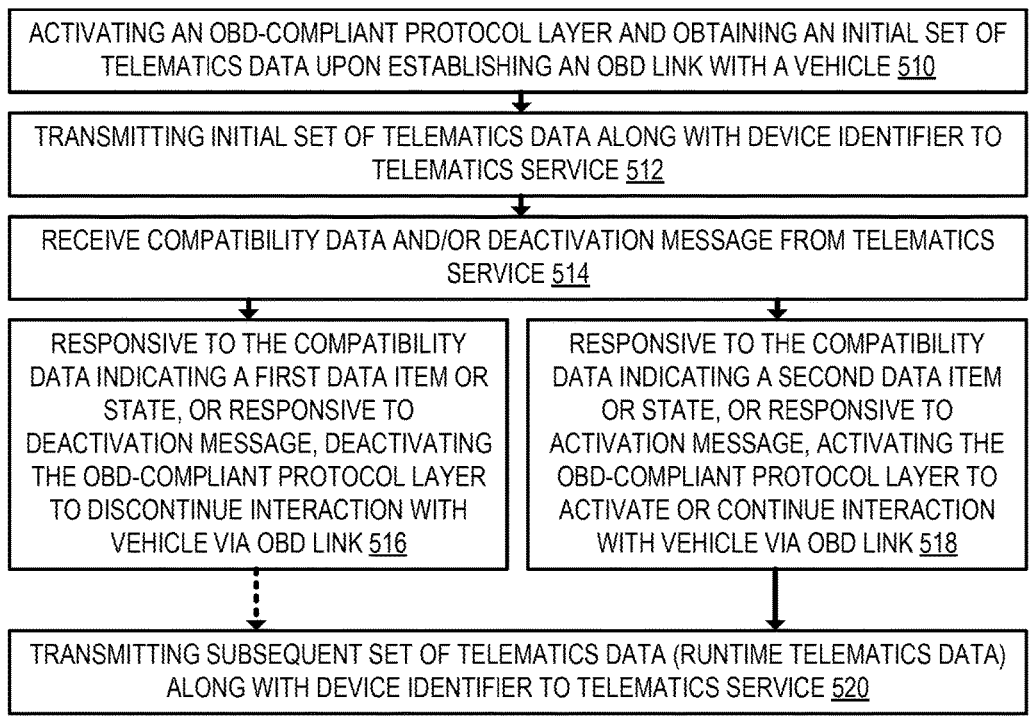
FIG. 5 is a flow diagram depicting an example method of performing a compatibility workflow by e.g., a telematics device.

FIG. 5 is a flow diagram depicting an example method 500 of performing a compatibility workflow. In an example, method 500 or portions thereof may be performed by a telematics device (e.g., telematics device 130 of FIG. 1) executing a telematics program (e.g., telematics program 140 of FIG. 1). Method 500 may be performed in combination with methods 300 and 400 of FIGS. 3 and 4, for example.

At 510, the method includes upon the OBD link being established with the on-board electronic control system, activating an OBD-compliant protocol layer, and obtaining an initial set of telematics data for the vehicle, including a vehicle identifier. At 512, the method includes transmitting the initial set of telematics data over the wireless communication network along with a device identifier of the telematics device directed to the telematics service. As previously described with reference to method 300 of FIG. 3, the initial set of telematics data may be operable at the telematics service to respond with compatibility data for a group of vehicles of which the vehicle indicated by the vehicle identifier is a member with respect to a group of telematics devices of which the telematics device indicated by the device identifier is a member.

At 514, the method includes receiving the compatibility data from the telematics service over the wireless communication network. In at least some implementations, the compatibility data may be received as one or more data items, and the telematics device may interpret the received data items to perform one or more operations. In other implementations, the telematics service may interpret the one or more data items of the compatibility data, and may send messages to the telematics device based on and responsive to applicable data items. In this example, the telematics device receives the messages and performs one or more operations responsive to those messages. Alternatively or additionally, the telematics device may receive a deactivation message at 514.

At 516, the method includes responsive to the compatibility data indicating a first data item or state, responsive to a deactivation message, deactivating the OBD-compliant protocol layer to discontinue interaction with the on-board electronic system of the vehicle via the OBD link. At 518, the method includes responsive to the compatibility data indicating a second data item or state, responsive to an activation message, activating or continuing interaction of the telematics device with the on-board electronic system of the vehicle via the OBD link using the OBD-compliant protocol layer to obtain runtime telematics data of a set of data fields specified by the second data item during operation of the vehicle.

At 520, the method includes transmitting a subsequent set of telematics data including the runtime telematics data to the telematics service over the wireless communication network. Operation 520 may correspond to the runtime phase of the compatibility workflow. Operation 520 may not be performed if the interaction with the vehicle is discontinued at 516. However, for implementations in which the compatibility workflow is performed on a granular per data item basis, the runtime telematics data may be collected and transmitted at 520 for data items indicated as compatible, while not performing operation 520 with respect to incompatible data items. Here, for example, the telematics device may reduce data transmitted to the telematics service and/or reduce bandwidth requirements by limiting the runtime telematics data that is transmitted to the compatible data items.

FIG. 6 depicts an example graphical user interface (GUI) 600 of a client application operating at a client device. The client application is an example of client program 174 of FIG. 1, and user interface 178 of FIG. 1 is an example of GUI 600. Furthermore, it will be understood that GUI 600 is a non-limiting example of a GUI that may be presented by a client application via a graphical display device associated with a client computing device, and that GUI 600 may take various other forms and may present various other information.

Within this example, GUI 600 includes data items 610-626 for corresponding data fields. Data items 610-626 are non-limiting examples of telematics data. Data item 610 is an example of compatible runtime telematics data that represents a measured value corresponding to a fuel level of the vehicle. Data item 612 is an example of derivative runtime data that represents a computed value for miles to refuel that may be computed by the telematics device, telematics service, or the client application from real-time and historical runtime telematics data, for example. Data item 614 is another example of derivative runtime data that represents a computed value for average miles per gallon fuel consumption that may be computed by the telematics device, telematics service, or the client application from real-time and historical runtime telematics data, for example.

Data item 616 is an example of an incompatible data item within the runtime telematics data that represents a measured value corresponding to real-time vehicle speed. Within GUI 600, visual indicators may be presented that inform the user that data item 616 is an incompatible data item. For example, the data field identifier "Current speed" is presented with asterisks, and the data item value "600" is presented with asterisks to inform the user that this data item is inaccurate due to incompatibility between the on-board electronic system of the vehicle and the telematics device. Alternatively, data item 616 and its corresponding data field may not be presented via GUI 600 due to the incompatibility.

Data item 618 is an example of derivative runtime data that represents a time since last oil change, which may be obtained by the telematics device, telematics service, or the client application based on an oil change code received from the vehicle at the telematics device via the OBD link.

Data item 620 is an example of an inaccurate data item within the runtime telematics data that represents a measured value corresponding to real-time vehicle mileage. Within GUI 600, visual indicators may be presented that inform the user that data item 616 is inaccurate, but not necessarily due to incompatibility between the telematics device and the vehicle. For example, the data field identifier "Mileage" is presented with strikethrough of the text, and the data item value is also presented with strikethrough to inform the user that this data item is inaccurate. Alternatively, data item 620 and its corresponding data field may not be presented via GUI 600 due to the inaccuracy. As previously described, inaccuracy caused by incompatibility may be distinguishable from inaccuracy not caused by incompatibility based on the pre-established compatibility data and the vehicle group models, for example. Presenting an indication of the likely cause of an inaccuracy may provide the user with useful information concerning the vehicle and the interaction of the vehicle with the telematics device.

Data item 622 is an example of a derivative telematics data that is based on a code reported by the vehicle to the telematics device via the OBD link. Here, the data field for data item 622 corresponds to a maintenance issue, and data item 622 indicates that a headlight of the vehicle requires replacement. Data item 622 may or may not be accurate. A user may inspect the vehicle to determine whether a headlight of the vehicle is out, and may report the result of that inspection via the client application. For example, the user may select data item 620 or the data field or some other selector to summon another GUI or GUI element by which the user may submit a report. If the user's reporting is consistent with data item 622, then the data field and data item may be determined to be compatible. However, if the user's reporting is inconsistent with data item 622, then the data field and data item may be determined to be either incompatible or inaccurate not resulting from incompatibility.

Data item 624 is an example of a vehicle identifier in the form of a 17-digit VIN that is received from the vehicle by the telematics device via the OBD link. Data item 626 is an example of a device identifier of the telematics device that is associated with the telematic data that is transmitted by the telematics device to the telematics service or client application.

Data item 620 is another example of an incompatible data item that represents mileage of the vehicle reported as real-time telematics data via the OBD link. Again, visual indicators may be used to inform the user that data item 620 represents incompatible or inaccurate data. In at least some implementations, incompatible data may be distinguished from inaccurate data by a different visual identifier.

In view of the disclosed compatibility workflow, machine learning and big data analytics may be used to observe and identify patterns across different makes, models, years, and types of vehicles that have similar technical capabilities in terms of telematics data reporting, enabling norms to be established for vehicle groups and telematics device groups across broad populations. As the collected data sets grow over time as telematics devices and users report their data, simple questions that can be answered by the telematics platform, such as "can I get fuel reading from the car?" can mature into the ability for the telematics platform to answer much more complex questions such as "how quickly should the transmission temperature of the car start overheating when driving at 200 mph on a racetrack, while pulling 1.3G in the curves?".

In at least some implementations, the methods and workflow described herein may be tied to a computing system of one or more computing devices. In particular, such methods and workflow may be implemented as a computer-application program or service, an application-programming interface (API), a library, and/or other computer-program product.

Figure 7:
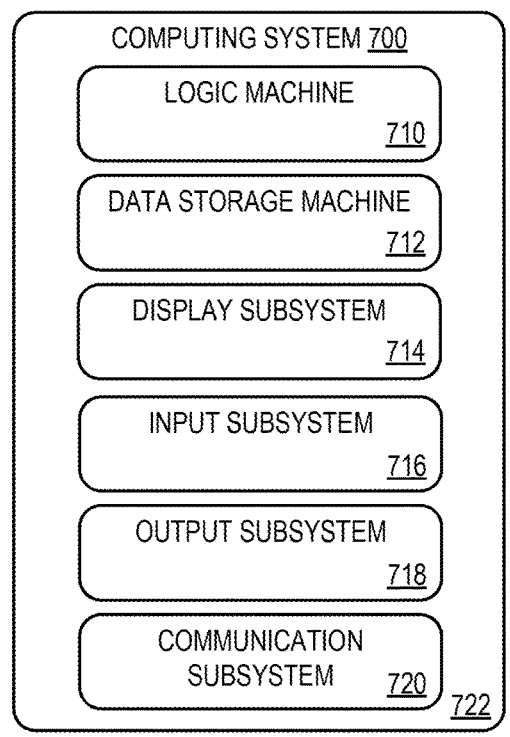
FIG. 7 depicts additional aspects of an example computing system.

FIG. 7 schematically shows a non-limiting example of a computing system 700 that can enact one or more of the methods and workflow described above. For example, computing system 700 may be representative of computing system 100 of FIG. 1, or the various computing devices and/or computing platforms thereof. Computing system 700 may take the form of one or more personal computers, server computers, tablet computers, network computing devices, gaming devices, mobile computing devices, mobile communication devices (e.g., smart phone), telematics devices, on-board electronic systems of vehicles, and/or other computing devices.

Computing system 700 includes a logic machine 710 and a data storage machine 712. Computing system 700 may optionally include a display subsystem 714, an input subsystem 716, an output subsystem 718, a communication subsystem 720, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 712 includes one or more physical devices configured to hold instructions executable by the logic machine to implement the methods and workflow described herein. When such methods and workflow are implemented, the state of storage machine 712 may be transformed—e.g., to hold different data.

Storage machine 712 may include removable and/or built-in devices. Storage machine 712 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 712 may include volatile, nonvolatile, dynamic, static, read/write, read-only, random-access, sequential-access, location-addressable, file-addressable, and/or content-addressable devices.

It will be appreciated that storage machine 712 includes one or more physical devices. However, aspects of the instructions described herein alternatively may be propagated by a communication medium (e.g., an electromagnetic signal, an optical signal, etc.) that is not held by a physical device for a finite duration. Furthermore, aspects of instructions described herein may reside on removable media devices, such as represented schematically at 722.

Logic machine 710 and storage machine 712 may be collectively referred to as a computing platform, such as the various computing platforms described in FIG. 1. Aspects of logic machine 710 and storage machine 712 may be integrated together into one or more hardware-logic components. Such hardware-logic components may include field-programmable gate arrays (FPGAs), program- and application-specific integrated circuits (PASIC/ASICs), program- and application-specific standard products (PSSP/

ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 712. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, may refer to an application program or collection of programs executable across multiple user sessions. A service may be available to one or more system components, programs, and/or other services. In some implementations, a service may run on one or more server-computing devices, referred to collectively as a server system.

When included, display subsystem 714 may be used to present a visual representation of data held by storage machine 712. This visual representation may take the form of a graphical user interface (GUI). As the herein described methods and processes change the data held by the storage machine, and thus transform the state of the storage machine, the state of display subsystem 714 may likewise be transformed to visually represent changes in the underlying data. Display subsystem 714 may include one or more graphical display devices utilizing virtually any type of technology. Such display devices may be combined with logic machine 710 and/or storage machine 712 in a shared enclosure 722, or such display devices may be peripheral display devices.

When included, input subsystem 716 may comprise or interface with one or more user-input devices such as a keyboard, mouse, touch screen, microphone, inertial sensor, etc. When included, output subsystem 718 may comprise or interface with one or more output devices such as an audio speaker, a haptic feedback device (e.g., a vibration motor), etc. When included, communication subsystem 720 may be configured to communicatively couple computing system 700 with one or more other computing devices or computing systems. Communication subsystem may include wired and/or wireless communication devices compatible with one or more different communication protocols. As non-limiting examples, the communication subsystem may be configured for communication via an OBD link, a wireless telephone network, or a wired or wireless local, persona, or wide-area network. In some embodiments, the communication subsystem may allow computing system 700 to send and/or receive messages to and/or from other devices via a network such as the Internet or via an OBD link, etc.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system implementing a telematics service, the method comprising:
   obtaining a set of telematics data for a vehicle transmitted by a telematics device over a wireless communication network, the telematics device interfacing with an on-board electronic system of the vehicle via an on-board diagnostics (OBD) link;
   identifying, within the set of telematics data, a vehicle identifier of the vehicle and a device identifier of the telematics device;
   updating account profile information to indicate a relationship between the vehicle identifier and the device identifier;
   retrieving vehicle profile information for a group of vehicles of which the vehicle is a member based on the vehicle identifier, the vehicle profile information including compatibility data for the group of vehicles with respect to a group of telematics devices of which the telematics device indicated by the device identifier is a member;
   responsive to the compatibility data indicating a first state,
      sending a deactivation message to the telematics device indicated by the device identifier over the wireless communication network, the deactivation message operable at the telematics device to deactivate at least one interaction of the telematics device with the on-board electronic system of the vehicle via the OBD link, and
      updating the account profile information to indicate the deactivation of the interaction of the telematics device indicated by the device identifier; and
   sending the account profile information or a portion thereof to a client application operating at a client device over a wide area network;
   wherein the deactivation message is operable at the telematics device to deactivate an OBD-compliant protocol layer to deactivate the interaction of the telematics device with the on-board electronic system of the vehicle via the OBD link.

2. The method of claim 1, further comprising:
   responsive to the compatibility data indicating a second state,
      sending an activation message to the telematics device indicated by the device identifier over the wireless communication network, the activation message operable at the telematics device to activate or continue the interaction of the telematics device with the on-board electronic system of the vehicle via the OBD link, and
      updating the account profile information to indicate the activation of the interaction of telematics device indicated by the device identifier.

3. The method of claim 2, wherein the set of telematics data is an initial set of telematics data; and
   wherein the interaction of the telematics device with the on-board electronic system includes transfer of runtime telematics data from the on-board electronic system of the vehicle to the telematics device via the OBD link during operation of the vehicle; and
   wherein the method further comprises:

obtaining a subsequent set of telematics data for the vehicle transmitted by the telematics device over a wireless communication network, the subsequent set of telematics data including or indicating the runtime telematics data during operation of the vehicle;

identifying, within the subsequent set of telematics data, the vehicle identifier of the vehicle and the device identifier of the telematics device;

further updating the account profile information to indicate the runtime telematics data or derivative data thereof; and sending the account profile information or a portion thereof indicating the runtime telematics data or the derivative data thereof to the client application operating at the client device over the wide area network.

4. The method of claim 3, further comprising:
comparing the runtime telematics data for the vehicle to a combined set of runtime telematics data within the vehicle profile information that was obtained from a population of vehicles of the group of vehicles of which the vehicle is a member to determine a relationship between the runtime telematics data and the combined set of runtime telematics data;

further updating the account profile information to indicate the relationship between the runtime telematics data and the combined set of runtime telematics data; and sending the account profile information or a portion thereof indicating the relationship to the client application operating at the client device over the wide area network.

5. The method of claim 4, further comprising:
responsive to the relationship determined between the runtime telematics data and the combined set of runtime telematics data exhibiting at least a threshold correlation with each other, directing the client application to present the runtime telematics data or the derivative data thereof at the client device;

responsive to the relationship determined between the runtime telematics data and the combined set of runtime telematics data not exhibiting at least the threshold correlation with each other, directing the client application to present an indication of incompatibility at the client device with respect to the runtime telematics data or the derivative data thereof without presenting the runtime telematics data or the derivative data and/or sending the account profile information or a portion thereof to the client application without the runtime telematics data or the derivative data thereof being included.

6. The method of claim 4, wherein the runtime telematics data includes two or more telematics data items;

wherein comparing the runtime telematics data for the vehicle to the combined set of runtime telematics data within the vehicle profile information is performed for each of the telematics data items to determine a respective relationship between each data item of the runtime telematics data and a corresponding data item of the combined set of runtime telematics data;

wherein further updating the account profile information to indicate the relationship between the runtime telematics data and the combined set of runtime telematics data is performed for each data item of the runtime telematics data to obtain a respective relationship for each data item of the runtime telematics data; and wherein sending the account profile information or a portion thereof indicating the relationship to the client application includes sending an indication of each relationship for each data item of the runtime telematics data.

7. The method of claim 6, wherein the client application presents an indication of each relationship for each data item at the client device as either a compatible or incompatible data item based on its respective relationship to the combined set of runtime telematics data.

8. The method of claim 4, further comprising:
combining the runtime telematics data with the combined set of runtime telematics data to obtain an updated combined set of telematics data; and
storing the updated combined set of telematics data within the vehicle profile information at a database system.

9. The method of claim 3, wherein the subsequent set of telematics data for the vehicle further includes device-originating telematics data obtained from one or more sensors integrated with the telematics device; and
wherein the method further comprises:
comparing time-contemporaneous features of the device-originating telematics data to the runtime telematics data to determine a relationship between the device-originating telematics data and the runtime telematics data;
further updating the account profile information to indicate the relationship determined between the device-originating telematics data and the runtime telematics data; and
sending the account profile information or a portion thereof indicating the relationship to the client application operating at the client device over the wide area network.

10. The method of claim 9, further comprising:
updating the vehicle profile information based on the relationship determined between the device-originating telematics data and the runtime telematics data; and
storing the updated vehicle profile information at a database system.

11. The method of claim 1, wherein the account profile information indicating the deactivation of the interaction of telematics device with the on-board electronic system of the vehicle is operable at the client application to present a user instruction to disconnect the telematics device from the on-board electronic system of the vehicle.

12. The method of claim 1, wherein the compatibility data for the group of vehicles is based, at least in part, on a plurality of previously reported sets of telematics data obtained from a plurality of telematics devices of the group of telematics devices over wireless communication networks in which each of the plurality of telematics devices interface with a respective on-board electronic system of a respective vehicle of the group of vehicles via a respective OBD link.

13. The method of claim 1, wherein the compatibility data for the group of vehicles is based, at least in part, on a plurality of user-reported compatibility issues received as user input directed at a respective client application of a respective client device of a user, and is obtained from each of the client devices over a communication network.

14. The method of claim 1, further comprising:
sending predicted compatibility data to the client application operating at the client device over the wide area network, the predicted compatibility data obtained from the vehicle profile information for the vehicle identifier;
wherein the client application presents the predicted compatibility data at the client device, including an indication of compatibility and/or incompatibility with respect to each data item of a plurality of telematics data items supported by the telematics device.

15. The method of claim 14, wherein the predicted compatibility data is based, at least in part, on a plurality of previously reported sets of telematics data obtained from a plurality of telematics devices of the group of telematics devices over wireless communication networks in which each of the plurality of telematics devices interface with a respective on-board electronic system of a respective vehicle of the group of vehicles via a respective OBD link.

16. The method of claim 14, wherein the predicted compatibility data is based, at least in part, on a plurality of user-reported compatibility issues received as user input directed at a respective client application of a respective client device of a user, and is obtained from each of the client devices over a communication network.

17. The method of claim 1, wherein the set of telematics data indicates:
one or more pinout values measured across a connector of the OBD link, and/or
one or more error messages reported by the on-board electronic system to the telematics device via the OBD link, and/or
one or more failed attempts by the telematics device to pair with the on-board electronic system via the OBD link using an OBD-compliant protocol.

18. A method performed by a computing system implementing a telematics service, the method comprising:
obtaining a set of telematics data for a vehicle transmitted by a telematics device over a wireless communication network, the telematics device interfacing with an on-board electronic system of the vehicle via an on-board diagnostics (OBD) link;
identifying, within the set of telematics data, a vehicle identifier of the vehicle and a device identifier of the telematics device;
updating account profile information to indicate a relationship between the vehicle identifier and the device identifier;
retrieving vehicle profile information for a group of vehicles of which the vehicle is a member based on the vehicle identifier, the vehicle profile information including predicted compatibility data for the group of vehicles with respect to a group of telematics devices of which the telematics device indicated by the device identifier is a member; and
sending the predicted compatibility data to a client application operating at a client device over a wide area network,
wherein the client application presents the predicted compatibility data at the client device, including an indication of compatibility and/or incompatibility with respect to each data item of a plurality of telematics data items supported by the telematics device, and
wherein the predicted compatibility data is based, at least in part, on a plurality of previously reported sets of telematics data obtained from a plurality of telematics devices of the group of telematics devices over wireless communication networks in which each of the plurality of telematics devices interface with a respective on-board electronic system of a respective vehicle of the group of vehicles via a respective OBD link.

19. A telematics device to interface with an on-board diagnostics (OBD) connector of a vehicle's on-board electronic system, the telematics device comprising:
an OBD connector by which the telematics device establishes an OBD link with the on-board electronic system via the OBD connector of the vehicle;
a wireless communication interface by which the telematics device communicates with a telematics service hosted at a server system via a wireless communication network; and
a computing platform programmed to:
upon the OBD link being established with the on-board electronic control system, activate an OBD-compliant protocol layer, and obtain an initial set of telematics data for the vehicle, including a vehicle identifier;
transmit the initial set of telematics data over the wireless communication network along with a device identifier of the telematics device directed to the telematics service,
wherein the initial set of telematics data is operable at the telematics service to respond with compatibility data for a group of vehicles of which the vehicle indicated by the vehicle identifier is a member with respect to a group of telematics devices of which the telematics device indicated by the device identifier is a member;
receive the compatibility data from the telematics service over the wireless communication network; and
responsive to the compatibility data indicating a first state, deactivate the OBD-compliant protocol layer to discontinue interaction with the on-board electronic system of the vehicle via the OBD link;
responsive to the compatibility data indicating a second state, activate or continue interaction of the telematics device with the on-board electronic system of the vehicle via the OBD link using the OBD-compliant protocol layer to obtain runtime telematics data of a set of data fields specified by the second state during operation of the vehicle; and
transmit a subsequent set of telematics data including the runtime telematics data to the telematics service over the wireless communication network.

* * * * *